June 9, 1959   K. A. KLINGLER   2,890,084
FILLER PLATE FOR JOURNAL BOXES
Original Filed May 14, 1953   4 Sheets-Sheet 1
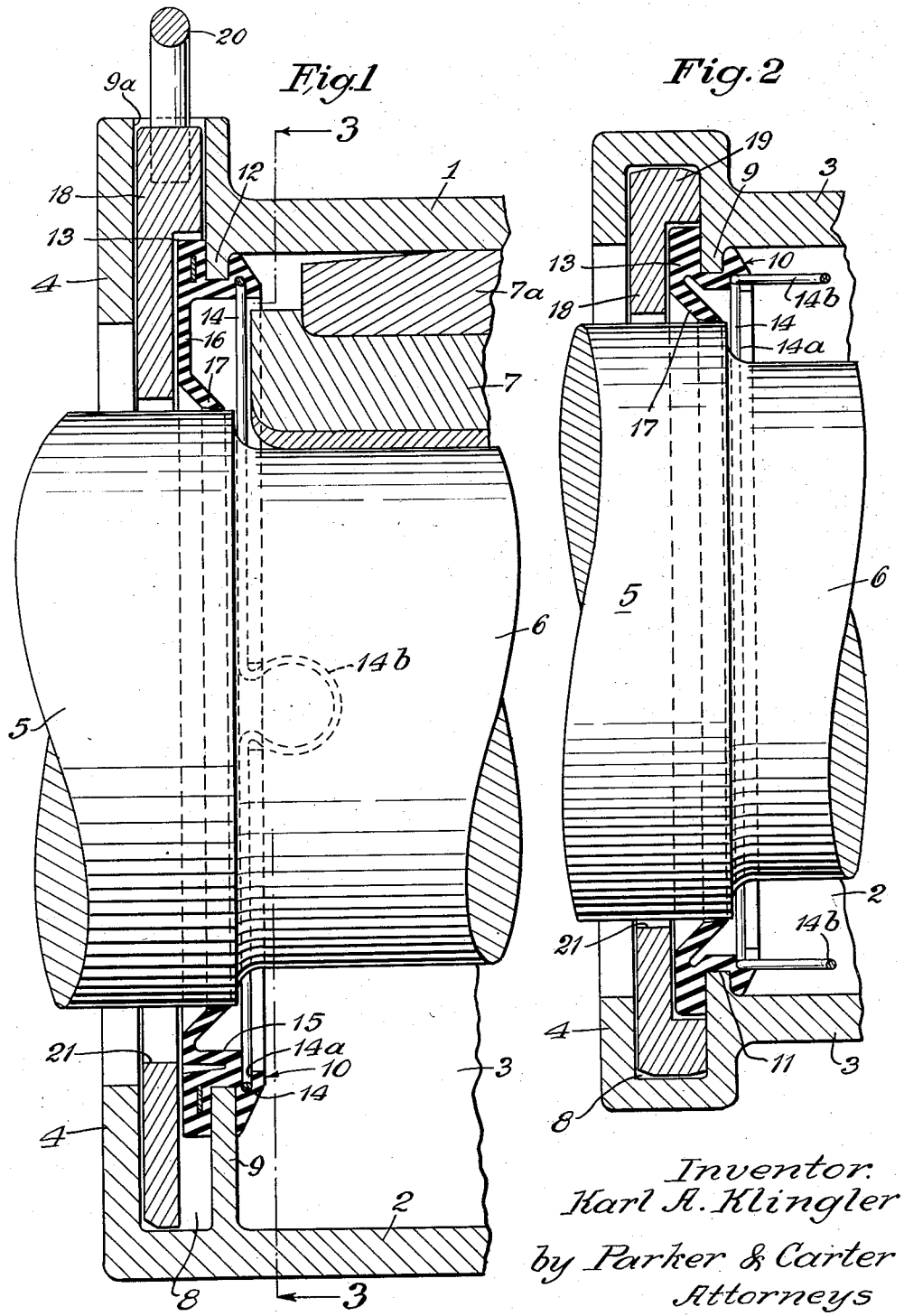
Inventor.
Karl A. Klingler
by Parker & Carter
Attorneys June 9, 1959 K. A. KLINGLER 2,890,084
FILLER PLATE FOR JOURNAL BOXES
Original Filed May 14, 1953 4 Sheets-Sheet 2

INVENTOR.
Karl A. Klingler
BY
Parker & Carter
Attorneys

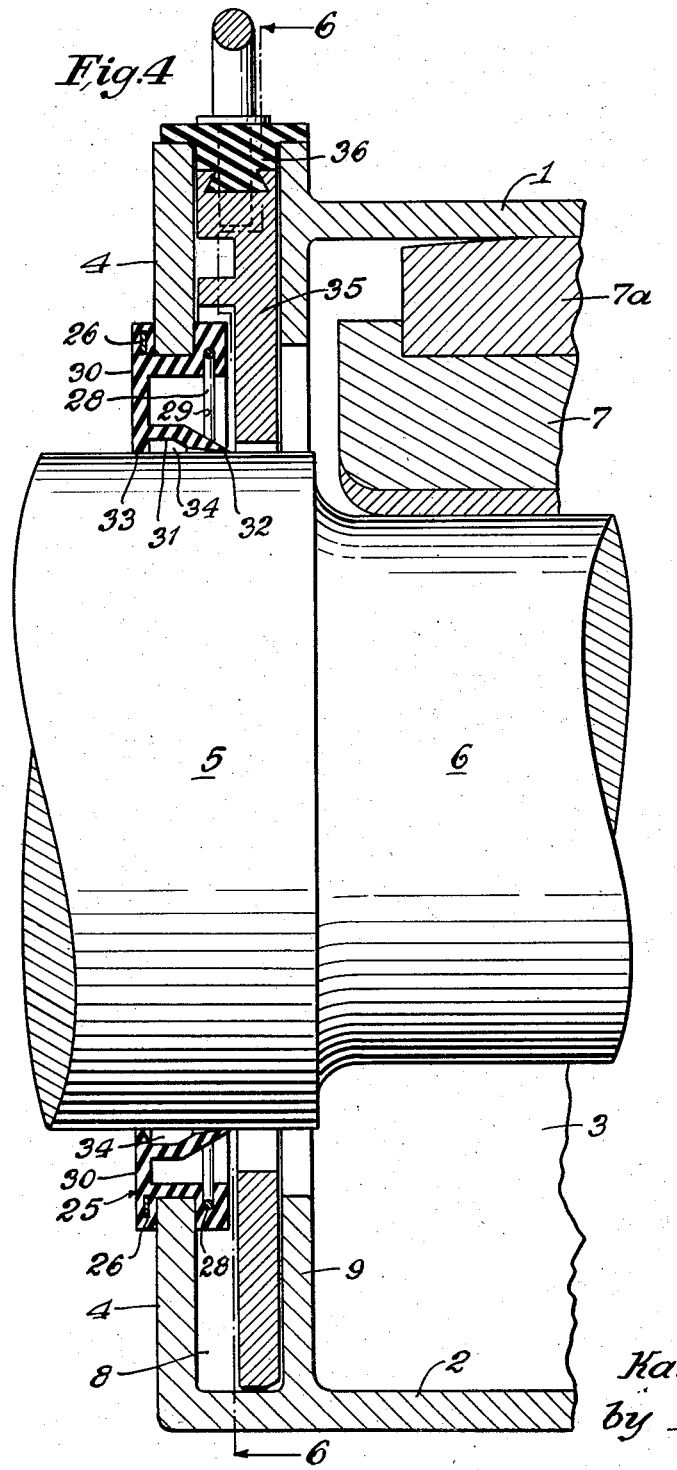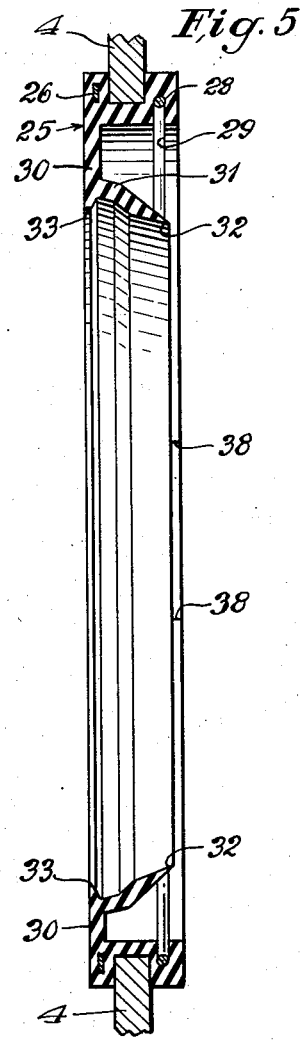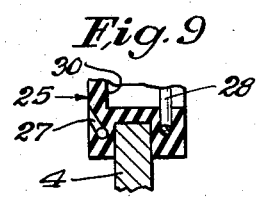

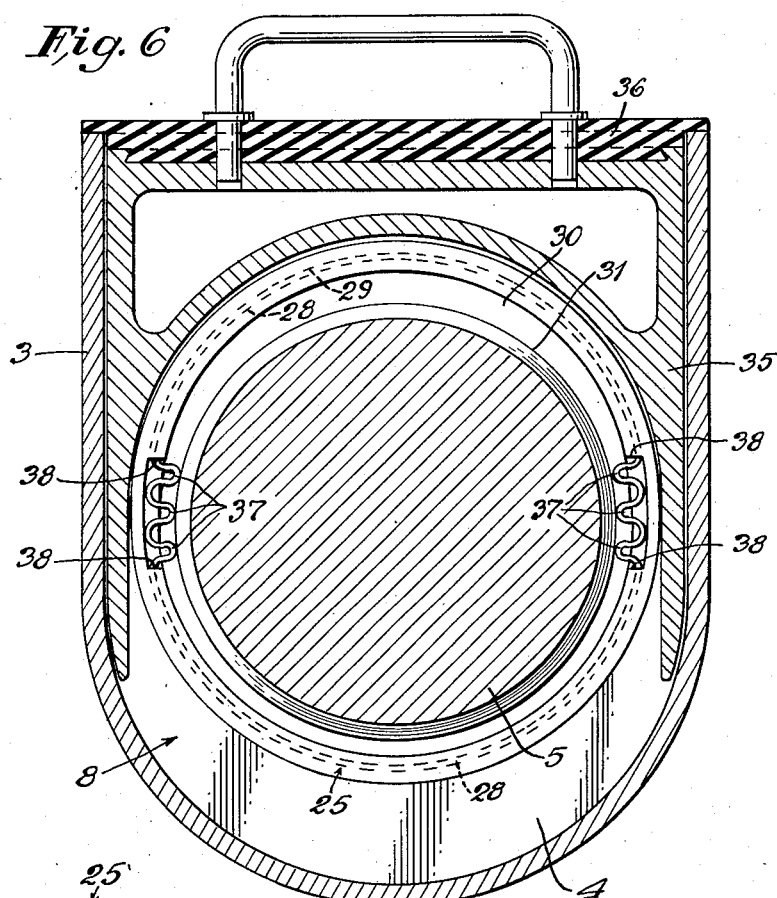
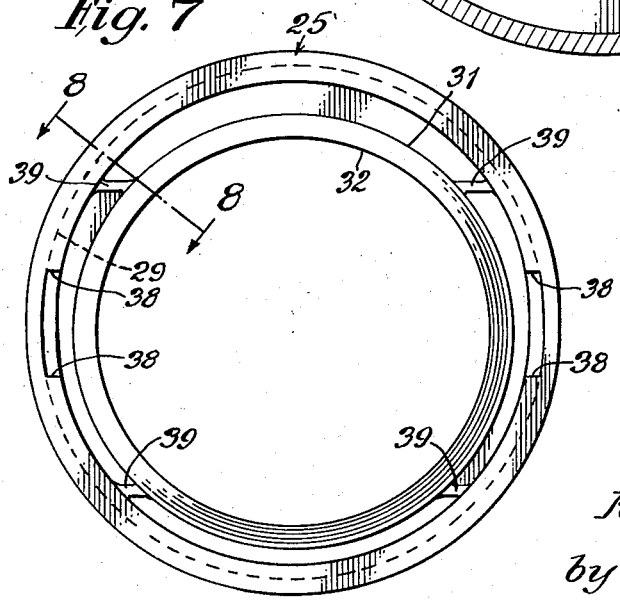
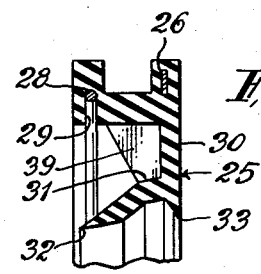

2,890,084

Patented June 9, 1959

2,890,084
FILLER PLATE FOR JOURNAL BOXES

Karl A. Klingler, Naperville, Ill.

Original application May 14, 1953, Serial No. 354,976, now Patent No. 2,768,012, dated October 23, 1956. Divided and this application August 6, 1956, Serial No. 602,129

1 Claim. (Cl. 308—80)

My invention relates to improvements in gaskets or packing rings associated with a railroad car axle and the inboard end of the journal box and has for one object to provide a gasket which will at the same time prevent entrance of dust, dirt, water or other foreign matter into, and will at the same time prevent loss of grease and oil from the box.

The present invention is especially directed toward protecting the gasket against damage which might result from contact with or to too close an approach to the body of the journal box by the axle or the journal.

This is a division of my co-pending application Serial No. 354,976, filed May 14, 1953, now Patent No. 2,768,012.

Other objects of the invention will appear from time to time in the specification and claim.

My invention is illustrated more or less diagrammatically in the accompanying drawings, wherein—

Figure 1 is a vertical section through a portion of the journal box taken in a plane which includes the axis of rotation of the journal;

Figure 2 is a horizontal section at right angles to Figure 1;

Figure 4 is a section along the line similar to the section of Figure 1 of a slightly different form of the device;

Figure 5 is a section similar to Figure 4 with parts omitted, illustrating the packing ring before being applied upon an axle;

Figure 6 is a section along the line 6—6 of Figure 4;

Figure 7 is a side illustration of the packing ring shown in Figures 4, 5 and 6;

Figure 8 is a section on an enlarged scale taken along the line 8—8 of Figure 7;

Figure 9 is a detail section of a modified form of packing ring.

Like parts are indicated by like characters in the specification and drawings.

Figure 3:
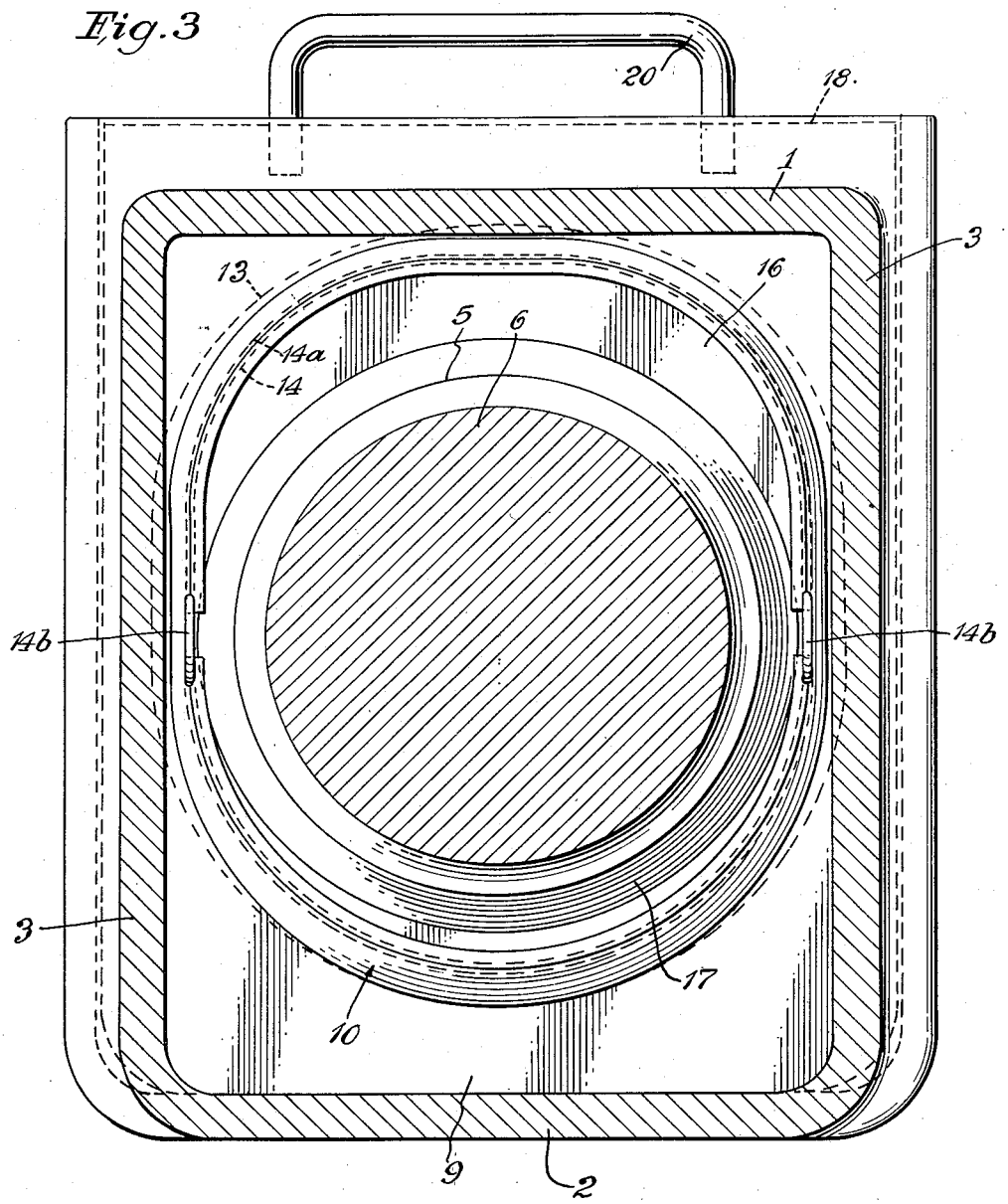
Figure 3 is a section along the line 3—3 of Figure 1.

It will be understood my invention is applicable to the usual type of railroad car axle journal box which includes a box, a brass adapted to ride on the axle journal, and a wedge adapted to hold the brass in position with respect to the box so that the load of the car is carried on the axle. My invention is intended to provide a packing means to encircle the axle or journal on the inboard end to close the journal box against the entry of foreign matter and against the escape of lubricant.

1 indicates the top, 2 the lower portion and 3 the side walls of the journal box. The front wall and its trap door, forming no part of the present invention, are not here illustrated. 4 is an apertured back wall of the journal box, apertured to permit entrance of the wheel axle 5, the reduced or journal portion of the axle 6 being enclosed within the box. 7 is the brass, riding on the journal 6. 7a is the wedge or key, thrust between the brass 7 and the top of the box 1 to carry the load.

8 is a groove or channel defined by the wall 4, the flanges 9 and the journal box body. This groove or aperture is opened across the top of the box as at 9a and is standard with all usual journal boxes.

In the form shown in Figures 1 to 3 inclusive, I provide an annular rubber or rubber-like or elastomeric packing ring 10, exteriorly grooved at 11 to engage the flange 9 at bottom and sides and the shorter flange 12 at the top. This ring has a relatively thick portion 13 extending inwardly about its entire periphery into the channel or groove 8 and also at its other side has a portion extending outwardly on the outside of the flanges 9 and 12, being held in position by the wire ring 14 so that this annular elastomeric ring or gasket snugly and permanently engages the flanges 9 and 12. The ring 14 is seated and retained in a groove 14a in the packing ring 10 and may be provided with a pair of expansion lops 14b as illustrated in Figures 1, 2 and 3.

The yielding ring 14 in its expanded position holds the gasket 10 outwardly against the flanges 9, 12 but may collapse centripetally to permit the gasket 10 to be inserted through the aperture defined by the flanges 9, 12. The position of the ring is such that the face of the ring, namely—that part of it to the left as shown in Figures 1 and 2, is perpendicular to the axis of an axle passing through an aperture in the ring.

Extending inwardly from this ring or gasket 10 is a flexible element or web 12, 16, which flexible element carries the inclined journal engaging member or lip 17. In order to fit the standard contour of the aperture on the inboard side of the journal box, the web as at 15 is in part generally parallel with the axis of rotation of the journal and as at 16 generally perpendicular thereto. The effective width, however of the web 15, 16 between the ring 10 and the axle contacting member or lip 17 being substantially the same so that the relationship between the member 17 and the axle is substantially the same throughout.

18 is a metallic filler plate socketed within the channel or groove 8 and backing up the packing ring 10. This plate on both vertical sides is of increased thickness as at 19, to completely fill the groove 8, but where it is in register with the rubber packing ring 10, it is reduced in thickness, as indicated in Figure 2 to leave space for the packing ring. A handle 20 may be provided for easy withdrawal of the member 18 when the axle and journal have been withdrawn from the box. The plate 18 is apertured, as at 21, the aperture being oval and greater in vertical diameter than in horizontal diameter, as indicated in Figures 1 and 2, the horizontal dimension of the aperture 21 being such as to limit lateral movement of the journal with respect to the journal box, the importance of which limitation will later appear.

The device shown in Figures 4 to 6 inclusive is similar to the device above described, the basic difference between the two devices being that in Figures 1 to 3, the elastomeric gasket is mounted on the flanges 9 and 12, whereas in Figures 4 to 6 the elastomeric gasket is mounted on the outer end 4 of the journal box.

25 is the elastomeric gasket mounted on the outboard end wall 4 of the journal box. A reinforcing member 26 may be cast in the gasket, or inlet into the gasket through a groove 27, as the case may be. Suffice it to say that this reinforcing member generally uncompressible, is located just outside the wall 4 of the journal box and holds the elastomeric gasket at the outside in position with respect to the aperture in the journal box. This gasket 25 is as indicated in Figures 4 and 5, provided with exterior grooves to engage the journal box wall 4. Just inside the box the gasket is held in position by the spring ring 28 engaging a groove 29 in the gasket, thus providing a snug fit and holding the gasket in close, tight relationship with the apertured journal box end wall.

Extending inwardly from the ring or gasket 25 is a radial web 30 which terminates in a sleeve 31 engaging the axle in two spaced annular areas as indicated at 32, 33. The annular clearance 34 between areas 32, 33 may be filled with grease or other suitable dust inhibitor. The areas 32, 33, both engaging the axle, insure that oil will not escape from and foreign matter will not enter the journal box.

35 is a filler plate similar to the plate 18 except that it does not completely encircle the axle as does the filler plate 18 backing up the ring 25, but because in this case the axle engaging portion 31 is outside of the groove 8, the groove is closed by the elastomeric packing means 36 to prevent entrance or egress of any material through the top open portion of the groove 8.

Because journal boxes are cast and not machined, there is always likelihood of rather substantial difference in dimensions of the diameter of the aperture in the journal box end wall 4 and especially in the aperture which encircles the journal and therefore a substantial change in diameter of the flange portion engaged by the spring ring 28 may be necessary. This is provided by arranging the spring ring with a plurality of convolutions 37 and cutting away the elastomeric portion as indicated between the lines 38 so that the elastomeric ring may expand or contract under the influence of the spring ring 28 to fit snugly the hole in the end wall of the journal box, no matter what its dimensions may be.

Referring to Figures 7 and 8, 39 indicates a plurality of ribs backing up the radial portion 30 of the ring. These ribs give the packing ring lateral stability and insure that as the axle moves longitudinally back and forth, as it well may, in the journal box, the movement of the axle contacting elements 32 and 33 will be so limited as to obviate the danger that the part 32 might be wedged between the plate 35 and the axle.

It will be noted with reference to Figures 4 and 6, as well as Figures 2 and 3, the clearance between the two vertical arms of the plates 18 and 35 and the axle itself is limited, being in the order of perhaps an eighth of an inch. This limits movement of the axle in a horizontal plane along lines perpendicular to its axis of rotation. This is for the express purpose of preventing such movement of the axle as might cause disengagement of the brass with the axle and the wedge between the brass and the top of the journal box. Such disengagement occasionally takes place when, especially in switching or humping, the car is too suddenly stopped or the wheels are too suddenly braked. Under these circumstances, if there is too much play between the axle and the box, the journal may run out from under the brass or may move the brass laterally with respect to the wedge enough to cause disengagement. Clearance sufficient to permit this is essential to compensate for different sizes of axle and journal boxes, but it is easy enough to provide these filler plates 18 or 35 to compensate for different axle diameter journal box aperture relationship.

I use the term "elastomeric" as a general term covering natural rubber, synthetic rubber or other compounds or materials which have in general the same physical characteristics as natural rubber.

I have illustrated the filler plate in one case as straddling the axle and being open at the bottom, in the other case as apertured to encircle the axle about its entire periphery. Each one may be used. Each has advantages. The straddling filler plate can be lost, the one which encircles the axle must be inserted before the axle is inserted in the box but cannot be lost. They have this in common that the clearances between them and the axle are less than the clearances between the axle and any part of the box so they furnish—being of metal—positive abutments to prevent the danger of pinching of the packing gasket or rim between the axle and the journal box in the event of improper accidental displacement of the journal with respect to the box and the axle.

I claim:

In combination with a railroad car axle journal box, closed at its inboard end by two parallel, centrally apertured, spaced walls, to define a generally rectangular pocket encircling the apertures, a centrally apertured gasket overlapping and supported on one side of said walls, the gasket aperture being of lesser diameter than the wall apertures, the gasket projecting inwardly from the wall supporting it toward but short of the opposite wall, a removable apertured rigid metallic filler plate within the pocket co-extensive therewith, parallel to the gasket and interposed between the gasket and the other wall, the width of the filler plate aperture being less than the diameter of the wall apertures.

References Cited in the file of this patent

UNITED STATES PATENTS

| | | |
|---|---|---|
| 740,524 | Busenbenz et al. | Oct. 6, 1903 |
| 1,649,439 | Bates | Nov. 15, 1927 |
| 2,105,871 | Vigne | Jan. 18, 1938 |
| 2,637,604 | Potter | May 5, 1953 |
| 2,758,854 | Fitzsimmons | Aug. 14, 1956 |